United States Patent [19]

Siemsen et al.

[11] 4,242,645
[45] Dec. 30, 1980

[54] GAS LASER SYSTEMS

[75] Inventors: Klaus J. Siemsen, Ottawa; John Reid, Hamilton, both of Canada

[73] Assignee: Canadian Patents and Development Limited, Ottawa, Canada

[21] Appl. No.: 780,062

[22] Filed: Mar. 22, 1977

[51] Int. Cl.³ .............................................. H01S 3/223
[52] U.S. Cl. ................................................. 331/94.5 G
[58] Field of Search .................... 331/94.5 M, 94.5 Q, 331/94.5 ML, 94.5 N, 94.5 G

[56] References Cited

U.S. PATENT DOCUMENTS

| 3,550,034 | 12/1970 | Hanst | 331/94.5 R |
|---|---|---|---|
| 3,638,137 | 1/1972 | Krupke | 331/94.5 Q |
| 3,979,694 | 9/1976 | Goldhar et al. | 331/94.5 M |
| 3,998,557 | 12/1976 | Javan | 331/94.5 C |

Primary Examiner—William L. Sikes
Attorney, Agent, or Firm—Edward Rymek

[57] ABSTRACT

A gas laser system which provides sequence lines of emission in addition to the regular lines. The system includes a discharge cavity having a discharge tube and a hot gas absorber cell. The lasing gas and the gas in absorber are identical and may be either $CO_2$, $N_2O$ or isotopes of this gas. The absorber cell is approximately 1/5 to ⅓ the length of the discharge cavity with the interior temperature of the absorber cell being greater than 200° C. and the pressure within the cell being in the order of 20 torr.

4 Claims, 7 Drawing Figures

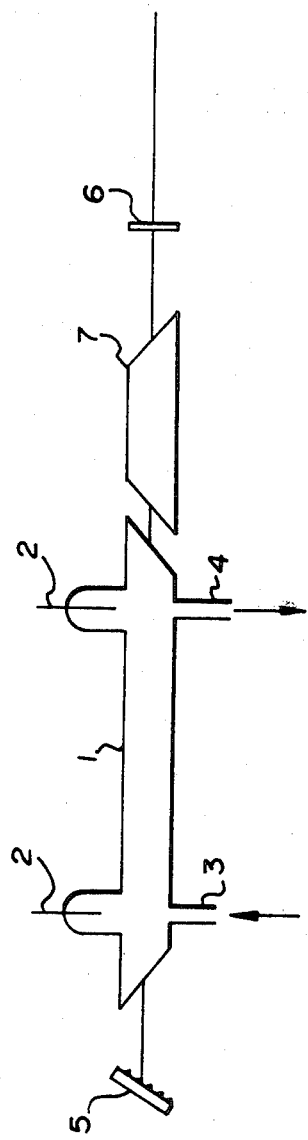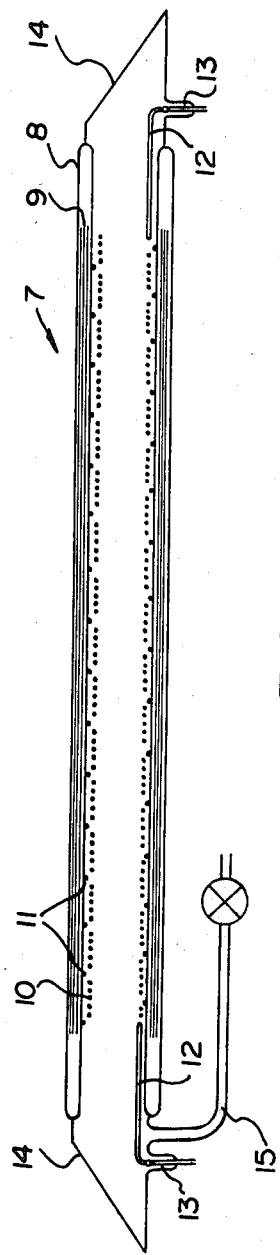
FIG. 1
FIG. 2

GAS LASER SYSTEMS

BACKGROUND OF THE INVENTION

This invention relates to a gas laser system and in particular to a gas laser system which emits radiation at a discrete set of lines in addition to the radiation at the regular set of lines.

Conventional gas lasers which use $CO_2$ or an isotope thereof, emit many discrete lines centered between approximately 9 and 11 μm. These regular laser bands are the result of $(00°1\text{-}[10°0, 02°0]_{I,II})$ transitions. Similarly, conventional grating-tuned gas lasers which use $N_2O$ or an isotope thereof, emit many discrete lines centered around 10.65 μm. These laser lines are the result of $(00°1\text{-}10°0)$ transitions.

Though these conventional lasers have found widespread use in such fields as molecular absorption studies, it has been found that for many applications, the laser in question does not have a spectral line which coincides with the specimen under study.

SUMMARY OF THE INVENTION

It is therefore an object of this invention to provide a gas laser system for producing new laser emission lines.

It is a further object of this invention to provide a gas laser system for producing laser emission lines which are positioned between the regular laser emission lines.

These and other objects are achieved in a gas laser system which includes a gas laser cavity for producing laser action of a lasing gas that may be energized to at least the 00°2 energy level for that gas and a hot gas absorber cell within the cavity, the cell containing gas identical to the lasing gas for at least partially absorbing the regular laser lines of the lasing gas. The lasing gas may be selected from the group consisting of $CO_2$, an isotope of $CO_2$, $N_2O$, an isotope of $N_2O$. The absorber cell has a length of 1/5 to ⅓ the length of the discharge tube in the cavity, an interior temperature above 200° C. and a gas pressure within the cell in the order of 20 torr.

BRIEF DESCRIPTION OF THE DRAWINGS

In the drawings:

FIG. 1 schematically illustrates the laser system in accordance with the present invention;

FIG. 2 is a cross-section view of a hot gas absorber cell;

DESCRIPTION OF THE EMBODIMENTS OF THE INVENTION

Figure 3:
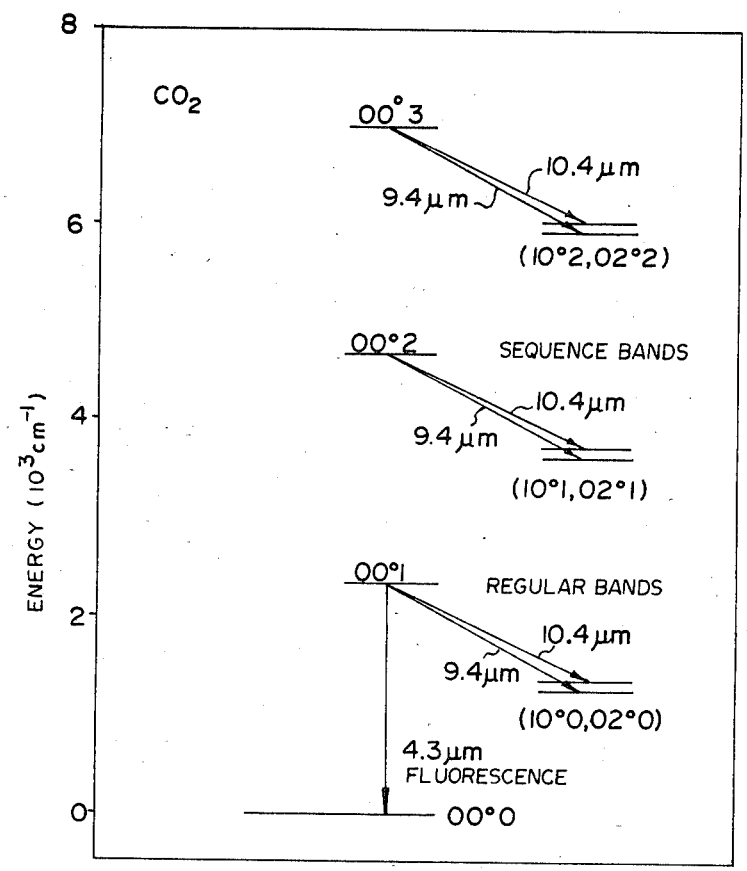
FIG. 3 is an energy level diagram of $CO_2$.

In accordance with the present invention, the laser cavity system illustrated in FIG. 1 includes a discharge tube 1 with its electrodes 2 and gas inlet 3 and outlet 4, a grating 5 and a spherical reflecting mirror 6 which may either be pierced or partially reflecting. In the discharge tube, some of the molecules of the gas which is used in the laser system must be raised to the 00°2 energy level or higher such that the gas will lase in the sequence lines. The system further includes a gas absorber cell 7 positioned within the cavity between the discharge tube 1 and the reflecting mirror 6 or between the discharge tube 1 and the grating. The absorber cell 7 is filled with a gas which is identical to the lasing gas in the discharge tube 1, i.e. if the lasing gas is $CO_2$, an isotope of $CO_2$, $N_2O$ or an isotope of $N_2O$, then the gas in the absorber cell will be either $CO_2$, the isotope of $CO_2$, $N_2O$ or the isotope of $N_2O$ respectively.

The absorber cell may be of the type shown in cross section in FIG. 2. Cell 7 consists primarily of a vacuum jacket 8, preferably made of quartz, containing several layers of wrinkled aluminum foil 9 which acts as radiation shields. An internal heater coil 10, such as a wound nichrome wire, is located within the cell 7 to heat the interior of the cell 7. The heater coil 10 may be wound such that some of the windings 11 protrude from the main coil 10 and only these windings 11 make contact with the inner wall of the jacket 8. In addition, the number of turns per cm may increase from the center of the heater coil 10 outward to achieve a more uniform temperature profile over the length of the cell 7. The heater coil 10 is connected to the outside of the cell 7 by feed-through wires 12 which are sealed by epoxy seals or other vacuum seals 13 in the ends of the cell 7. Finally, infrared transmitting (NaCl, ZnSe, GaAs) windows 14 at Brewster's angle are sealed onto the ends of cell 7 by a flexible epoxy and an opening valve 15 is provided to fill and retain the desired gas into the cell.

This type of cell can provide interior gas temperatures up to 600° C. in the central region while the outside of the cell remains at temperatures at approximately 40° C. or lower. In addition, the ends of the cell including the windows remain relatively cool, i.e. close to the ambient temperature.

The absorption of the regular $CO_2$ lines increases with the temperature of the cell up to an interior temperature of approximately 500° C. and with the pressure of the gas within the cell up to a pressure of approximately 20 torr. Therefore, a minimum length of cell relative to the cavity length is important to obtain absorption of all of the regular lines.

One criterion to use in determining the length of cell 7 is to ensure that all regular $CO_2$ laser lines have a net loss per pass, i.e. the loss in the hot cell should be greater than the discharge tube gain for all lines. The gains on P(18) 10.6 μm is 1.0%/cm for a typical cw $CO_2$ discharge, the minimum active hot cell length to be ~⅓ of the discharge length. However, this criterion can be relaxed somewhat in practice, and the hot cell length designed to ensure that the gain on the sequence bands is greater than the net gain on the regular bands. Under these conditions, regular lines with low J values may occasionally lase as the cavity grating is tuned, but the sequence lines will dominate. A sequence $CO_2$ laser has been successfully operated with a discharge length of 140 cm and an active hot cell length of only 20 cm. However, it was difficult to obtain those sequence lines which lie very close to the regular lines due to competition from these regular lines. When the active hot cell length was increased to 32 cm, these competition effects were removed, and all sequence lines would lase without difficulty. Thus a hot cell 7 length in the order of 1/5 to ⅓ the laser discharge length is found to be satisfactory for $CO_2$ or its isotopes and has also been found to perform satisfactorily for $N_2O$ or its isotopes.

$CO_2$ and the isotopes of $CO_2$, i.e. $^{13}CO_2^{16}$, $^{12}CO_2^{18}$, $^{14}CO_2^{16}$, $^{13}CO_2^{18}$ and the "mixed" isotopes such as $O^{16}C^{12}O^{18}$ are all gases which may be raised to the 00°2 energy level or 00°3 energy level. FIG. 3 shows the relevant energy levels in the $CO_2$ molecule. The regular rotation-vibration transitions in the $(00°1-[10°0, 02°0]_{I,II})$ bands for a $CO_2$ laser consist of P and R branches, the lines being tabulated in Table 1 below.

Figure 4A:
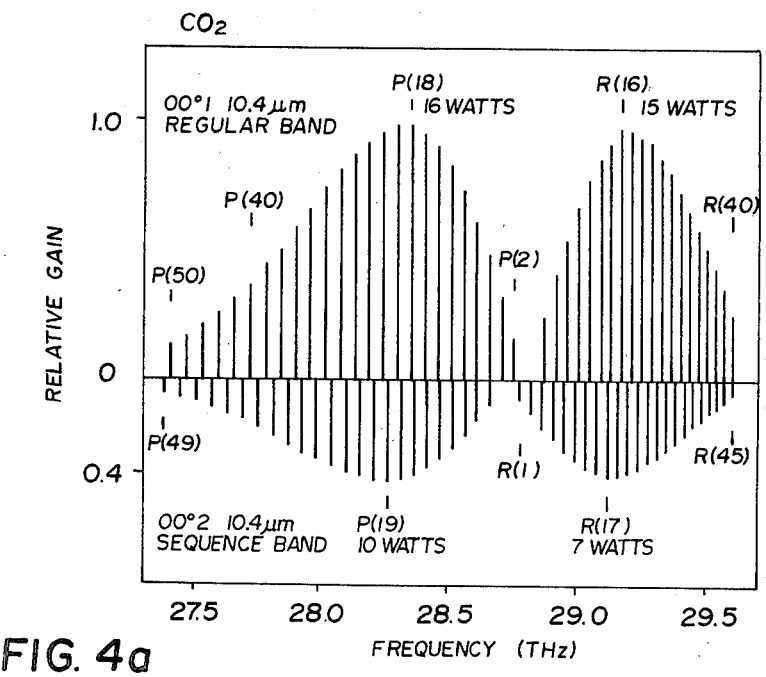
FIGS. 4a and 4b show the spectrum of the regular lines and sequency lines of $CO_2$.
Figure 4B:
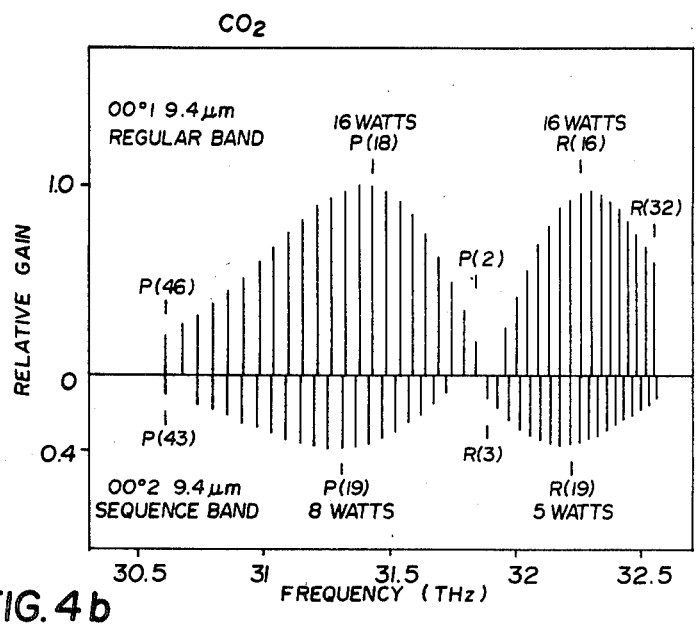

However, if the regular transition lines are suppressed by means of the absorber cell 7, and molecules of the $CO_2$ are energized to the 00°2 energy level, new lines appear between the regular lines. These lines are due to rotation-vibration transitions in the $(00°2-[10°1, 02°1]_{I,II})$ bands. These sequence bands are very similar to the regular $CO_2$ laser bands as shown in FIGS. 4a and 4b. They consist of P and R branches, with alternate J values missing, and at room temperature have a maximum gain in the region of J=19. However, in contrast to the regular laser bands, the sequence bands contain only odd J values in the lower level. These transition lines are given in Tablt 2. In addition, if molecules are energized to the 00°3 energy level, further new lines appear between the regular lines. These transition lines are given in Table 3.

TABLE 1

| | $CO_2$ | | | |
|---|---|---|---|---|
| | $00°1-[10°0,02°0]_I$ 10.4 μm BAND | | $00°1-[10°0,02°0]_{II}$ 9.4 μm BAND | |
| J | P-BRANCH (MHz) | R-BRANCH (MHz) | P-BRANCH (MHz) | R-BRANCH (MHz) |
| 0 |  | 28832026.2 |  | 31913172.5 |
| 2 | 28761840.9 | 28877902.4 | 31842934.5 | 31958996.0 |
| 4 | 28714137.7 | 28923046.4 | 31795108.6 | 32004017.3 |
| 6 | 28665704.5 | 28967457.0 | 31746483.7 | 32048236.2 |
| 8 | 28616541.7 | 29011132.9 | 31697061.4 | 32091652.6 |
| 10 | 28566649.1 | 29054072.6 | 31646843.3 | 32134266.8 |
| 12 | 28516026.6 | 29096274.3 | 31595831.7 | 32176079.4 |
| 14 | 28464673.6 | 29137736.1 | 31544028.8 | 32217091.2 |
| 16 | 28412589.7 | 29178455.6 | 31491437.3 | 32257303.3 |
| 18 | 28359773.7 | 29218430.6 | 31438060.1 | 32296717.6 |
| 20 | 28306224.8 | 29257658.5 | 31383900.3 | 32335334.0 |
| 22 | 28251941.6 | 29296136.3 | 31328961.4 | 32373156.2 |
| 24 | 28196922.5 | 29333861.1 | 31273247.1 | 32410185.7 |
| 26 | 28141165.9 | 29370829.6 | 31216761.2 | 32446424.9 |
| 28 | 28084669.7 | 29407038.2 | 31159508.1 | 32481876.6 |
| 30 | 28027431.8 | 29442493.3 | 31101492.1 | 32516543.6 |
| 32 | 27969449.7 | 29477160.8 | 31042718.0 | 32550429.1 |
| 34 | 27910720.7 | 29511066.6 | 30983190.7 | 32583536.6 |
| 36 | 27851242.0 | 29544196.3 | 30922915.4 | 32615869.7 |
| 38 | 27791010.3 | 29576545.1 | 30861897.5 | 32647432.2 |
| 40 | 27730022.4 | 29608108.1 | 30800142.6 | 32678228.3 |
| 42 | 27668274.4 | 29638980.2 | 30737656.6 | 32708262.4 |
| 44 | 27605762.5 | 29668855.8 | 30674445.6 | 32737538.9 |
| 46 | 27542482.6 | 29698029.4 | 30610516.0 | 32766062.8 |
| 48 | 27478430.1 | 29726394.9 | 30545874.1 | 32793838.8 |
| 50 | 27413600.4 | 29753946.0 | 30480526.6 | 32820872.2 |

TABLE 2

| | $CO_2$ | | | |
|---|---|---|---|---|
| | $00°2-[10°1,02°1]_I$ 10.4 μm BAND | | $00°2-[10°1,02°1]_{II}$ 9.4 μm BAND | |
| J | P-BRANCH (MHz) | R-BRANCH (MHz) | P-BRANCH (MHz) | R-BRANCH (MHz) |
| 1 | 28713202.5 | 28782286.5 | 31769295.2 | 31838379.1 |
| 3 | 28666248.4 | 28827443.3 | 31722209.4 | 31883404.2 |
| 5 | 28618576.4 | 28871879.4 | 31674300.9 | 31927603.9 |
| 7 | 28570186.7 | 28915593.7 | 31625571.2 | 31970978.2 |
| 9 | 28521079.4 | 28958584.7 | 31576022.0 | 32013527.2 |
| 11 | 28471254.4 | 29000850.8 | 31525655.2 | 32055251.3 |
| 13 | 28420711.3 | 29042389.9 | 31474473.0 | 32096151.3 |
| 15 | 28369449.4 | 29083200.0 | 31422477.9 | 32136228.2 |
| 17 | 28317468.1 | 29123278.7 | 31369672.7 | 32175483.1 |
| 19 | 28264766.1 | 29162623.6 | 31316060.5 | 32213917.7 |
| 21 | 28211342.4 | 29201231.7 | 31261644.7 | 32251533.7 |
| 23 | 28157195.3 | 29239100.1 | 31206428.9 | 32288333.3 |
| 25 | 28102323.3 | 29276225.7 | 31150416.9 | 32324318.8 |
| 27 | 28046724.4 | 29312604.9 | 31093612.9 | 32359492.9 |
| 29 | 27990396.6 | 29348234.2 | 31036021.5 | 32393858.6 |
| 31 | 27933337.4 | 29383109.6 | 30977647.4 | 32427419.0 |

TABLE 2-continued

| | $CO_2$ | | | |
|---|---|---|---|---|
| | $00°2-[10°1,02°1]_I$ 10.4 μm BAND | | $00°2-[10°1,02°1]_{II}$ 9.4 μm BAND | |
| J | P-BRANCH (MHz) | R-BRANCH (MHz) | P-BRANCH (MHz) | R-BRANCH (MHz) |
| 33 | 27875544.3 | 29417227.1 | 30918495.6 | 32460177.7 |
| 35 | 27817014.6 | 29450582.4 | 30858571.4 | 32492138.4 |
| 37 | 27757745.2 | 29483171.0 | 30797880.3 | 32423305.3 |
| 39 | 27697733.0 | 29514988.1 | 30736428.3 | 32553682.5 |
| 41 | 27636974.5 | 29546028.8 | 30674221.5 | 32583274.8 |
| 43 | 27575466.1 | 29576287.9 | 30611266.4 | 32612087.1 |
| 45 | 27513203.9 | 29605760.0 | 30547569.5 | 32640124.4 |
| 47 | 27450183.9 | 29634439.6 | 30483138.0 | 32667392.4 |
| 49 | 27386401.7 | 29662320.8 | 30417979.0 | 32693896.6 |
| 51 | 27321852.8 | 29689397.5 | 30352100.1 | 32719643.2 |

TABLE 3

| | $CO_2$ | | | |
|---|---|---|---|---|
| | $00°3-[10\ 20\ 2,02°2]_I$ 10.4 μm BAND | | $00°3-[10°2,02°2]_{II}$ 9.4 μm BAND | |
| J | P-BRANCH (MHz) | R-BRANCH (MHz) | P-BRANCH (MHz) | R-BRANCH (MHz) |
| 0 |  | 28679613.2 |  | 31721834.1 |
| 2 | 28610550.4 | 28724773.3 | 31652667.6 | 31766886.5 |
| 4 | 28563527.4 | 28769226.5 | 31605499.2 | 31811091.4 |
| 6 | 28516000.3 | 28812971.7 | 31557486.5 | 31854448.4 |
| 8 | 28467669.1 | 28856007.4 | 31508630.7 | 31896957.3 |
| 10 | 28418633.9 | 28898331.9 | 31458933.5 | 31938618.4 |
| 12 | 28368894.3 | 28939943.3 | 31408396.9 | 31979432.1 |
| 14 | 28318449.9 | 28980839.3 | 31357023.1 | 32019399.0 |
| 16 | 28267300.0 | 29021017.6 | 31304814.5 | 32058519.9 |
| 18 | 28215443.5 | 29060475.4 | 31251773.7 | 32096796.1 |
| 20 | 28162879.3 | 29099210.0 | 31197903.7 | 32134228.9 |
| 22 | 28109605.9 | 29137218.1 | 31143207.5 | 32170819.9 |
| 24 | 28055621.7 | 29174496.5 | 31087688.7 | 32206571.0 |
| 26 | 28000924.8 | 29211041.6 | 31031350.9 | 32241484.3 |
| 28 | 27945513.0 | 29246849.5 | 30974197.9 | 32275562.2 |
| 30 | 27889384.0 | 29281916.1 | 30916233.9 | 32308807.3 |
| 32 | 27832535.1 | 29316237.4 | 30857463.2 | 32341222.4 |
| 34 | 27774963.6 | 29349808.5 | 30797890.5 | 32372810.6 |
| 36 | 27716666.4 | 29382625.0 | 30737520.8 | 32403575.3 |
| 38 | 27657640.1 | 29414681.7 | 30676359.0 | 32433520.1 |
| 40 | 27597881.2 | 29445973.4 | 30614410.5 | 32462648.8 |
| 42 | 27537386.0 | 29476494.8 | 30551681.0 | 32490965.5 |
| 44 | 27476150.4 | 29506240.0 | 30488176.3 | 32518474.4 |
| 46 | 27414170.3 | 29585203.3 | 30423902.5 | 32543180.2 |
| 48 | 27351441.1 | 29563378.4 | 30358866.0 | 32571087.7 |
| 50 | 27287958.2 | 29590758.9 | 30293073.3 | 32596201.9 |

Figure 5:
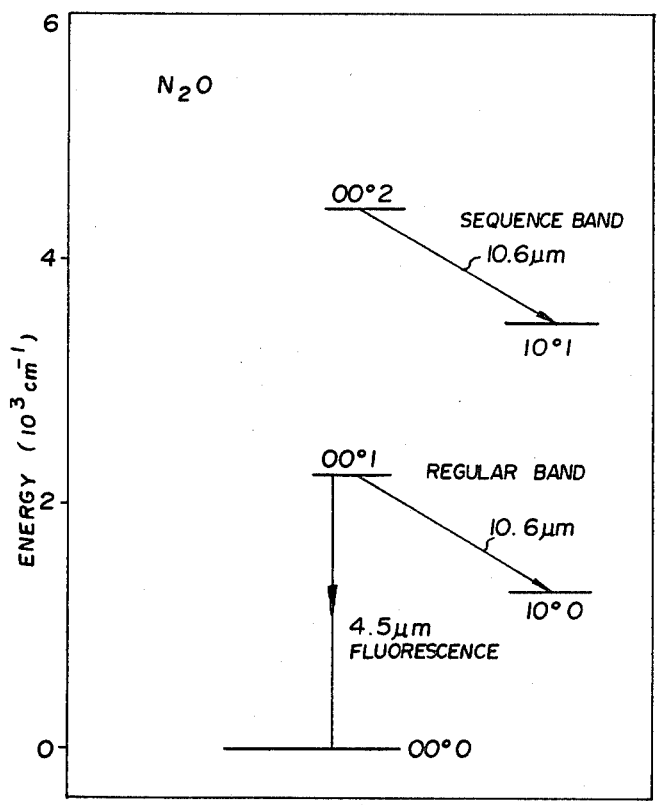
FIG. 5 is an energy level diagram for $N_2O$.
Figure 6:
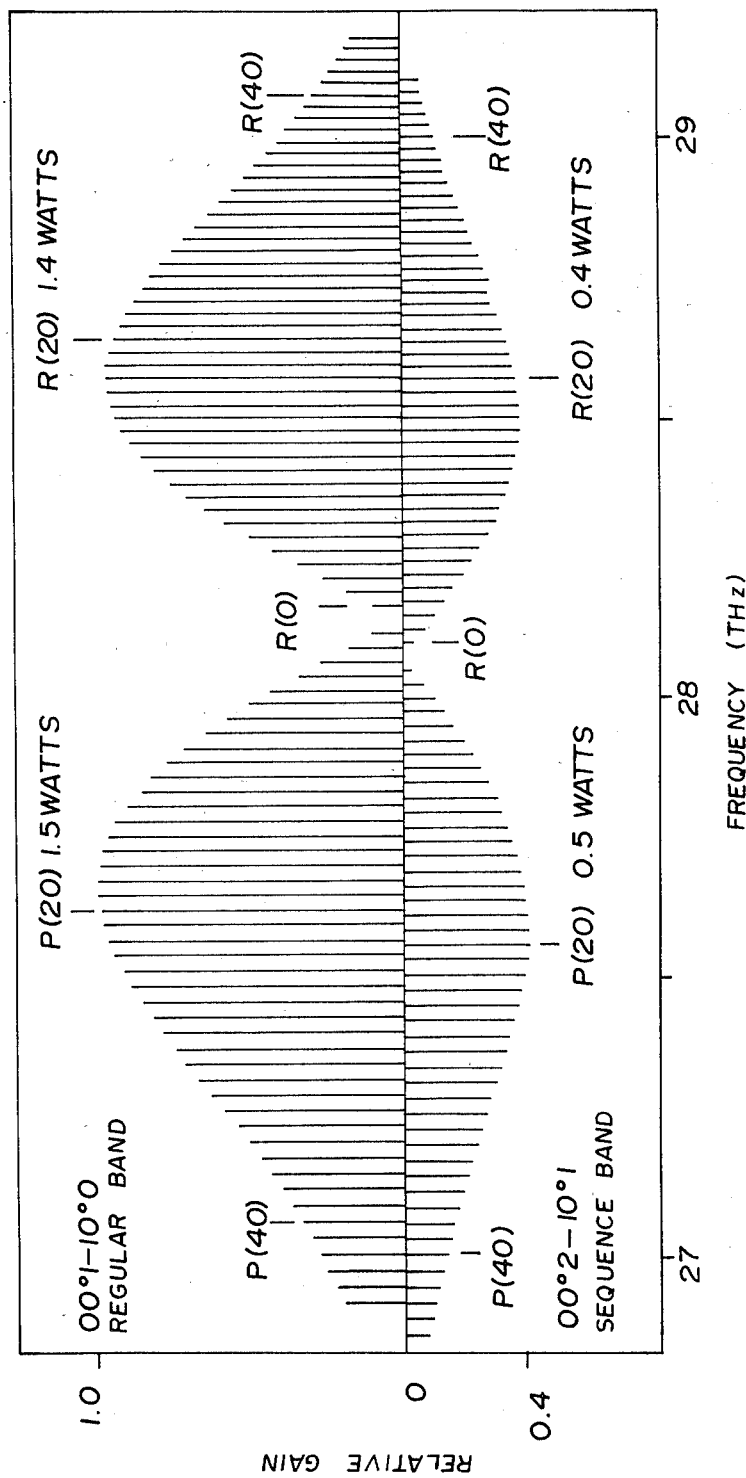
FIG. 6 shows the spectrum of the regular lines and sequence lines for $N_2O$.

As indicated above, laser systems in accordance with the present invention which use isotopes of $CO_2$ will provide a radiation output having regular radiation lines and/or sequence lines. It has further been determined that lasers using $N_2O$ or an isotope thereof may also be made to operate in accordance with the present invention. The emission of a conventional grating-tuned $N_2O$ laser consists of a number of closely spaced lines which belong to the regular (00°1-10°0) band centered around 10.65 μm as shown in FIG. 5. With a hot $N_2O$ absorber cell inside the cavity, the regular lines can be partially or totally suppressed and the new set of laser lines appears in c.w. emission, these lines belong to the (00°2-10°0) $N_2O$ band. FIG. 5 indicates the relevant energy levels in $N_2O$. The new (00°2-10°1) band, also referred to as a sequence band, is very similar to the regular (00°1-10°0) $N_2O$ band. The small anharmonicity of the $N_2O$ molecule causes the sequence lines to appear between the regular lines as can be seen from FIG. 6. In general, the sequence lines lie so close in frequency to the stronger, regular lines as can be seen in Tables 4 and 5 below, that they are not normally resolved. The hot cell absorber suppresses the regular lines rather than the sequence lines since the lower level 10°0 of the regular band lies only 1285 cm$^{-1}$ above the ground state whereas the lower level 10°1 of the sequence band lies at 3481 cm$^{-1}$. At elevated temperatures, the thermal population of the 10°0 level is sufficient to cause strong absorption for the regular laser lines, but the absorption of the sequence lines will be neglibible. This differential absorption between regular and sequence lines gives excellent discrimination provided the length, pressure and temperature of the absorber cell are properly chosen.

TABLE 4

N$_2$O 00°1–10°0 10.6 μm BAND

| J | P-BRANCH (MHz) | R-BRANCH (MHz) | J | P-BRANCH (MHz) | R-BRANCH (MHz) |
|---|---|---|---|---|---|
| 0 |  | 28171033.2 | 26 | 27462934.1 | 28782715.6 |
| 1 | 28121099.0 | 28195847.7 | 27 | 27435310.0 | 28804832.1 |
| 2 | 28095979.5 | 28220560.3 | 28 | 27407586.8 | 28826842.5 |
| 3 | 28070758.6 | 28245170.9 | 29 | 27379764.6 | 28848746.7 |
| 4 | 28045436.3 | 28269679.2 | 30 | 27351843.3 | 28870544.4 |
| 5 | 28020012.9 | 28294085.3 | 31 | 27323823.1 | 28892235.5 |
| 6 | 27994488.5 | 28318388.9 | 32 | 27295704.0 | 28913819.7 |
| 7 | 27968863.1 | 28342589.9 | 33 | 27267486.0 | 28935296.9 |
| 8 | 27943136.8 | 28366688.1 | 34 | 27239169.2 | 28956666.7 |
| 9 | 27917309.8 | 28390683.5 | 35 | 27210753.7 | 28977929.1 |
| 10 | 27891382.2 | 28414575.9 | 36 | 27182239.4 | 28999083.7 |
| 11 | 27865354.1 | 28438365.1 | 37 | 27153626.4 | 29020130.4 |
| 12 | 27839225.6 | 28462051.0 | 38 | 27124914.7 | 29041068.9 |
| 13 | 27812996.7 | 28485633.4 | 39 | 27096104.3 | 29061899.0 |
| 14 | 27786667.6 | 28509112.2 | 40 | 27067195.3 | 29082620.5 |
| 15 | 27760238.4 | 28532487.3 | 41 | 27038187.6 | 29103233.1 |
| 16 | 27733709.2 | 28555758.3 | 42 | 27009081.4 | 29123736.5 |
| 17 | 27707080.1 | 28578925.3 | 43 | 26979876.5 | 29144130.6 |
| 18 | 27680351.0 | 28601988.0 | 44 | 26950573.0 | 29164415.0 |
| 19 | 27653522.3 | 28624946.3 | 45 | 26921170.9 | 29184589.5 |
| 20 | 27626593.8 | 28647800.0 | 46 | 26891670.1 | 29204653.9 |
| 21 | 27599565.8 | 28670548.9 | 47 | 26862070.7 | 29224607.8 |
| 22 | 27572438.2 | 28693192.9 | 48 | 26832372.7 | 29244451.1 |
| 23 | 27545211.2 | 28715731.7 | 49 | 26802575.9 | 29264183.3 |
| 24 | 27517884.8 | 28738165.2 | 50 | 26772680.4 | 29283804.2 |
| 25 | 27490459.1 | 28760493.2 |  |  |  |

TABLE 5

N$_2$O 00°2–10° 10.6 μm BAND

| J | P-BRANCH (MHz) | R-BRANCH (MHz) | J | P-BRANCH (MHz) | R-BRANCH (MHz) |
|---|---|---|---|---|---|
| 0 |  | 28102011.1 | 26 | 27399694.7 | 28708465.8 |
| 1 | 28052492.6 | 28126618.4 | 27 | 27372293.3 | 28730389.0 |
| 2 | 28027581.6 | 28151124.3 | 28 | 27344793.5 | 28752207.0 |
| 3 | 28002569.7 | 28175528.5 | 29 | 27317195.4 | 28773919.4 |
| 4 | 27977457.0 | 28199831.0 | 30 | 27289499.2 | 28795526.3 |
| 5 | 27952243.5 | 28224031.7 | 31 | 27261705.0 | 28817027.3 |
| 6 | 27926929.5 | 28248130.4 | 32 | 27233812.8 | 28838422.3 |
| 7 | 27901514.9 | 28272126.9 | 33 | 27205822.6 | 28859711.2 |
| 8 | 27876000.0 | 28295021.2 | 34 | 27177734.6 | 28880893.7 |
| 9 | 27850384.9 | 28319813.1 | 35 | 27149548.9 | 28901969.7 |
| 10 | 27824669.6 | 28343502.4 | 36 | 27121265.5 | 28922939.0 |
| 11 | 27798854.3 | 28367089.0 | 37 | 27092884.5 | 28943801.5 |
| 12 | 27772939.1 | 28390572.8 | 38 | 27064406.0 | 28964556.9 |
| 13 | 27746924.1 | 28413953.7 | 39 | 27035830.1 | 28985205.1 |
| 14 | 27720809.4 | 28437231.4 | 40 | 27008156.7 | 29005745.9 |
| 15 | 27694595.1 | 28460405.9 | 41 | 26978386.1 | 29026179.0 |
| 16 | 27668281.4 | 28483476.9 | 42 | 26949518.2 | 29046504.4 |
| 17 | 27641868.3 | 28506444.4 | 43 | 26920553.1 | 29066721.8 |
| 18 | 27615355.9 | 28529308.1 | 44 | 26891490.9 | 29086831.1 |
| 19 | 27588744.3 | 28552068.0 | 45 | 26862331.7 | 29106832.0 |
| 20 | 27562033.6 | 28574723.9 | 46 | 26833075.4 | 29126724.4 |
| 21 | 27535224.0 | 28597275.6 | 47 | 26803722.3 | 29146508.0 |
| 22 | 27508315.5 | 28619722.9 | 48 | 26774272.3 | 29166182.7 |
| 23 | 27481308.3 | 28642065.8 | 49 | 26744725.5 | 29185748.3 |
| 24 | 27454202.3 | 28664304.0 | 50 | 26715081.9 | 29205204.6 |
| 25 | 27426997.8 | 28686437.4 |  |  |  |

We claim:

1. A gas laser system comprising:
   - a resonant laser cavity;
   - a discharge tube located within the laser cavity, said discharge tube containing a lasing gas selected from the group consisting of CO$_2$, an isotope of CO$_2$, N$_2$O, or an isotope of N$_2$O;
   - pumping means within the discharge tube for energizing some of the molecules of the lasing gas to at least the 00°2 energy level; and
   - a hot gas absorber cell located within the laser cavity, said hot gas absorber cell containing a gas identical to the lasing gas for absorbing the regular laser lines in emitted laser radiation allowing the lasing gas to lase in sequence laser lines.

2. A gas laser system as claimed in claim 1 wherein the gas laser cavity means includes a discharge tube having a predetermined length and absorber cell means has a length in the order of ¼ to ⅓ the length of the discharge tube.

3. A gas laser system as claimed in claim 2 which includes means for maintaining the pressure of the gas in the absorber cell up to a pressure of approximately 20 torr.

4. A gas laser system as claimed in claim 3 which further includes heating means for heating the gas within the absorber cell to a temperature greater than 300° C.

* * * * *